F. L. BURNS.
VEHICLE RUNNING GEAR.
APPLICATION FILED MAR. 27, 1915.
1,160,258.
Patented Nov. 16, 1915.
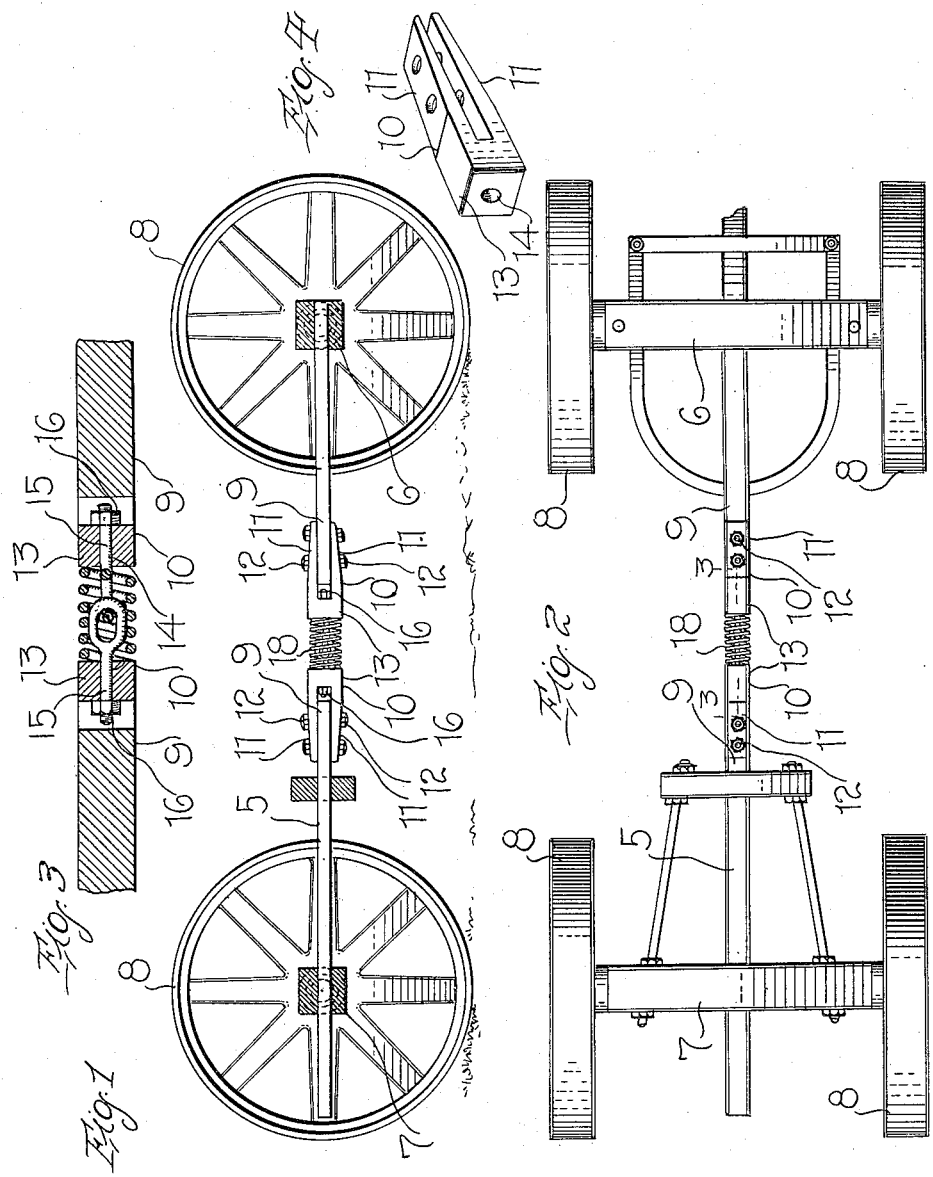
Inventor
F. L. BURNS
Witnesses
Robert M. Sutphen
A. L. Hind
By Watson E. Coleman
Attorney

UNITED STATES PATENT OFFICE.

FLOYD L. BURNS, OF CASPER, WYOMING.

VEHICLE RUNNING-GEAR.

1,160,258.  Specification of Letters Patent.  Patented Nov. 16, 1915.

Application filed March 27, 1915.  Serial No. 17,493.

*To all whom it may concern:*

Be it known that I, FLOYD L. BURNS, citizen of the United States, residing at Casper, in the county of Natrona and State of Wyoming, have invented certain new and useful Improvements in Vehicle Running-Gears, of which the following is a specification, reference being had to the accompanying drawings.

This invention relates to vehicle running gears and has for its primary object to provide improved means for relieving the reach pole of undue strain and obviating liability of breakage thereof when the forward vehicle wheels and bolster are turned.

The invention has for a more particular object to provide a running gear having a sectional reach pole, and means connecting said pole sections and including a shock absorbing spring whereby said sections are cushioned and yieldingly held against relative movement.

My invention has for another object to produce a device of the above character which is extremely simple in construction, strong and durable in practical use and highly efficient for the purposes in view.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a side elevation of a vehicle running gear constructed in accordance with the present invention; Fig. 2 is a top plan view thereof; Fig. 3 is a section taken on the line 3—3 of Fig. 2; Fig. 4 is a detail perspective view of one of the clip members which is attached to the sectional reach pole.

Referring in detail to the drawings, 5 designates the running gear of a vehicle which includes the front and rear vehicle axles 6 and 7 respectively, upon the ends of which the ground wheels 8 are mounted. The reach bar of the running gear consists of two sections 9, one of which is connected by the usual hounds to the rear vehicle axle, while the other is pivotally mounted at its forward end upon the front axle of the vehicle. To the opposed ends of the reach bar sections 9, the clips 10 are secured, each of said clips having elongated arms 11 between which the end of the reach pole section is disposed and secured by means of suitable bolts 12. These clips are preferably constructed of metal and the arms 11 are integrally connected by the enlarged ends 13, such enlargements being centrally provided with longitudinal openings 14. In the opening 14 of each clip, the shank of an eye-bolt 15 is disposed, said eye-bolts having threaded end portions to receive the nuts 16 which are disposed between the arms 11 of the clips. The other or outer ends of the eye-bolts are provided with suitable eyes 17 which are engaged in each other and permit of a free swinging movement of the forward section of the reach pole with respect to the rear section thereof.

A coil spring indicated at 18 is disposed over the eyes 17 and bears at its ends against the opposed ends of the clips secured upon the ends of the sections of the reach pole.

In the operation of my invention, it will be clearly understood from the foregoing description that when the forward truck of the vehicle upon which one of the reach pole sections is mounted is turned with respect to the rear truck, the spring 18 is placed under compression and acts as a yielding abutment between the pole sections to overcome undue strain upon the central portion of the pole and thereby eliminate all liability of the breakage of the same.

Thus it will be apparent that my invention greatly adds to the durability of the running gear and renders the same more serviceable and desirable in practical use.

From the foregoing it will be appreciated that I have produced a device which can be inexpensively manufactured, is not liable to easily get out of order and is highly efficient in practical operation.

While I have shown and described the preferred form and construction of the several elements, it will be understood that the invention is susceptible of considerable modification therein and I therefore reserve the right to resort to all such legitimate changes as may be fairly embodied within the spirit and scope of the invention, as claimed.

Having thus described the invention, what is claimed is:

The combination with a running gear including a reach pole consisting of two sections, of clips secured to the opposed ends of said sections, each of said clips including spaced elongated arms between which the reach pole section is adapted to be arranged and secured and an elongated end portion, integrally connecting said arms, an eye-bolt extending through said enlarged end of the clip and having a nut threaded upon one end, said eye-bolts having their eyes engaged with each other to permit of a limited movement of the pole sections, and a coil spring arranged upon said eye-bolts and bearing at its opposite ends against the respective clips.

In testimony whereof I hereunto affix my signature in the presence of two witnesses.

FLOYD L. BURNS.

Witnesses:
CHARLES W. OWEN,
JULIUS H. JOHNSTONE.

Copies of this patent may be obtained for five cents each, by addressing the "Commissioner of Patents, Washington, D. C."